United States Patent Office 2,942,056
Patented June 21, 1960

2,942,056
RECHARGEABLE BATTERY

Michel N. Yardney, New York, N.Y., assignor to Yardney International Corp., New York, N.Y., a corporation of New York Original applications Dec. 6, 1949, Ser. No. 131,320, now Patent No. 2,601,133, dated June 17, 1952, and Aug. 9, 1951, Ser. No. 241,718, now Patent No. 2,753,620, dated July 10, 1956. Divided and this application July 9, 1956, Ser. No. 596,542

3 Claims. (Cl. 136—135)

The present invention relates to batteries of the silver and zinc type in which the electrodes, consisting of silver and zinc and/or their oxides (depending upon the state of charge) preferably in powder form, are held under considerable pressure in a receptacle or casing containing little if any free electrolyte; this application is a divisional aplpication based on application Ser. No. 131,320, now U.S. Patent 2,601,133, and co-pending application Ser. No 241,718 now U.S. Patent 2,753,620, entitled Battery-Terminal Connection Method.

An object of the instant invention is to provide, in a battery as set forth above, a low-ohmic, shockproof electrical connection between the electrodes and the external terminals.

A feature of this invention is the provision of a terminal cap which firmly engages an integral projection of insulating material forming part of a wall portion, such as a cover, of the battery casing, this cap being also galvanically and mechanically connected with a conductor extending from the electrode assembly within the casing. The connection between the cap and the conductor is preferably effected by solder. A further feature is that the terminal connection includes a suitable marking, such as a distinctively colored washer, clamped in position between the cap and the casing or its cover.

The above and other objects and features of invention will become apparent from the following description, reference being had to the accompanying drawing in which.

Figure 1:
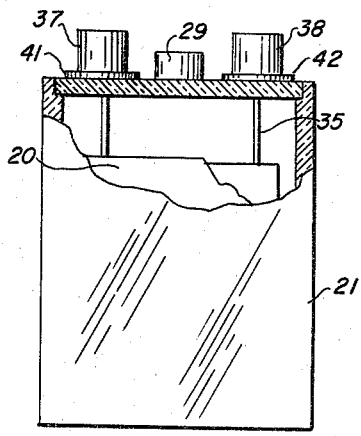
Fig. 1 is a side-elevational view of a battery made in accordance with the principles of the present invention.
Figure 2:
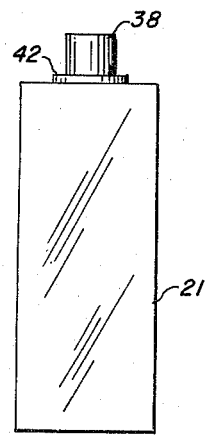
Fig. 2 is an end-elevational view of said battery.
Figure 3:
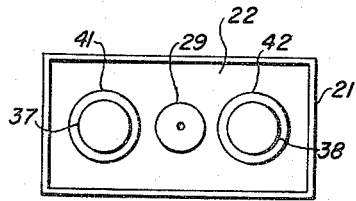
Fig. 3 is a top view of the same battery.

Referring to Figs. 1–3, there is shown a battery comprising a casing 21, a cover or lid 22 for this casing, and a set of terminals. The cover 22 is seated in a recess of the casing 21. The casing 21 and its lid 22 consist of a suitable dielectric material, usually polystyrene.

Figure 4:
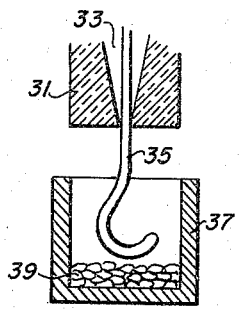
Fig. 4 is a detail view illustrating a step in the formation of a terminal connection that is the subject of this invention.
Figure 5:
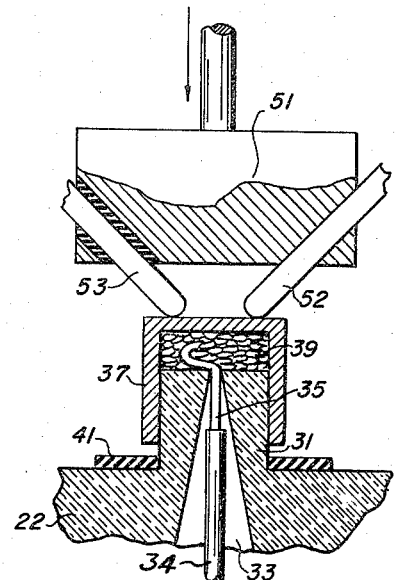
Fig. 5 is another detail view showing a subsequent step resulting in the formation of the terminal connection of this invention.

The lid 22 is further integrally provided, on opposite sides of the plug 29, with upstanding cylindrical projections 31 shown in Figs. 4 and 5, each provided with a conical, upwardly tapering bore 33 through which passes a conductor wire 35. Each wire 35, whose other extremity is embedded in an associated electrode 20 within casing 21, is coated with a suitable insulant 34, said coating extending partly into the electrode. The tops of the wires are conductively connected to preferably silver-plated metal caps 37, 38 which respectively embrace the projection 31 by means of blobs of solder 39, the latter also serving to hold the caps in place as some of the solder penetrates into and hardens within the conical bore 33.

Washers 41, 42, preferably distinctively colored to identify the positive and negative terminals, surround the projections 31 and are held in place by the caps 37 and 38 respectively. The projections 31 and their associated caps 37, 38 may also differ in size and shape for more convenient identification.

Figs. 4 and 5 illustrate how the conductor wires, metal caps, and washers are advantageously assembled to form a rigid unit with the projections 31 on the lid 22.

As shown in Fig. 4, the metal cap 37 is first inverted and filled with a predetermined amount of solder in the form of small fragments 39. The inverted lid 22, with a suitable length of wire 35 extending from its corresponding projection 31, is then brought down so that the cap 37 embraces the projection 31, causing the wire to buckle and trapping the solder pieces 39 in the intervening space. The lid 22 may now be righted, as shown in Fig. 5, and the cap 37, solder 39, and wire 35 are heated to melt the solder while the simultaneous exertion of pressure upon the cap forces the latter down upon the washer 41, thus giving the assembly shown in Figs. 1, 2, and 3.

The simultaneous application of heat and pressure is preferably accomplished by bringing a piston head 51, suitably provided with heavy current electrodes 52 and 53, down upon the cap 37 as illustrated in Fig. 5. The solder 39 of Fig. 4 is transformed into the homogeneous mass 39 of Fig. 5 by the application of current to the electrodes 52 and 53, thereby conductively and mechanically joining the wire 35 to the cap 37 which, by being thus held in place, also prevents the detachment of washer 41.

It should be understood that the invention is not limited to the precise structures shown and described, but is capable of numerous modifications and adaptations without exceeding its scope as stated in the object and defined in the appended claims.

I claim:

1. In an electric battery, in combination, a casing, an electrode inside said casing, a flexible conductor extending from said eltctrode, said casing having a wall element of insulating material formed with an outside projection and with a bore passing through said projection, said conductor passing through said bore, and a metal cap fitting over and around said projection, said cap being galvanically and mechanically united with said conductor by solder, said solder anchoring said cap to said projection.

2. The combination according to claim 1, comprising a washer surrounding said projection, said cap bearing upon said washer and maintaining same in position, said washer extending radially beyond said cap.

3. In an electric battery, in combination, a casing, an electrode inside said casing, a flexible conductor extending from said electrode, said casing being provided with a cover of insulating material formed with an outside projection and with a bore through said outside projection, said conductor passing through said bore, and a metal cap fitting over and around said projection, said cap being galvanically and mechanically united with said conductor by solder, said solder anchoring said cap to said projection.

References Cited in the file of this patent

UNITED STATES PATENTS

| | | |
|---|---|---|
| 576,720 | Brewer | Feb. 9, 1897 |
| 1,214,647 | Carpenter et al. | Feb. 6, 1917 |
| 1,266,814 | Kammerhoff | May 21, 1918 |
| 1,387,426 | Merritt | Aug. 9, 1921 |

(Other references on following page)

UNITED STATES PATENTS

| | | | |
|---|---|---|---|
| 1,453,791 | Gossling | May 1, | 1923 |
| 1,484,202 | Baker | Feb. 19, | 1924 |
| 1,642,224 | Bowen | Sept. 13, | 1927 |
| 1,671,016 | Dewey | May 22, | 1928 |
| 1,673,463 | MacKenzie | June 12, | 1928 |
| 1,907,420 | Finn | May 2, | 1933 |
| 2,289,512 | McKenney et al. | July 14, | 1942 |
| 2,625,575 | Ellis | Jan. 13, | 1953 |

FOREIGN PATENTS

| | | | |
|---|---|---|---|
| 16,509 | Great Britain | July 10, | 1914 |
| 120,479 | Great Britain | Nov. 14, | 1918 |
| 155,071 | Great Britain | Dec. 16, | 1920 |